No. 815,642. PATENTED MAR. 20, 1906.
W. T. SEARS.
SPEED CHANGER.
APPLICATION FILED SEPT. 29, 1905.
2 SHEETS—SHEET 1.
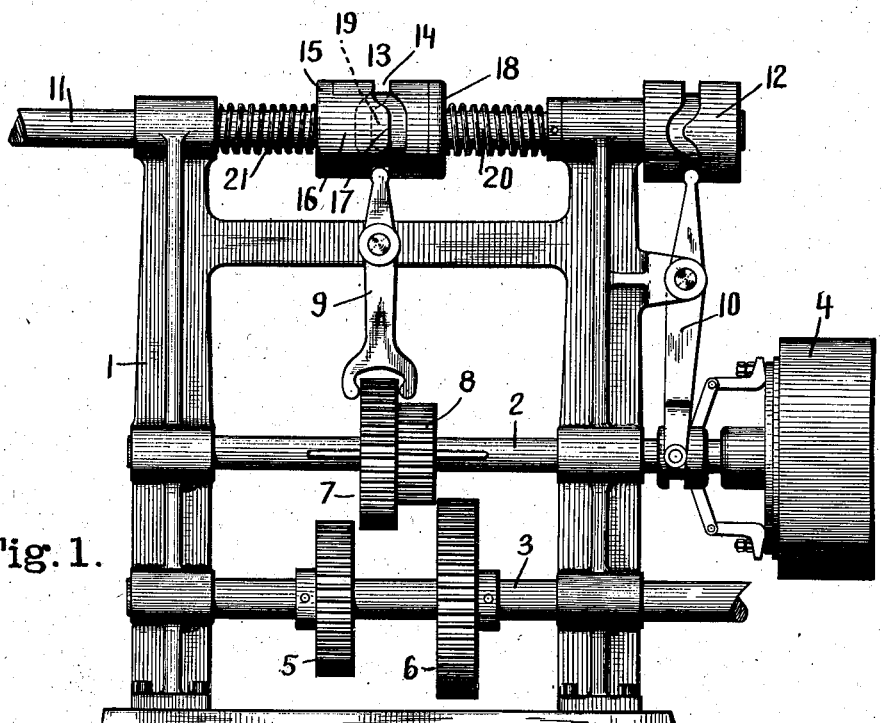
Fig. 1.
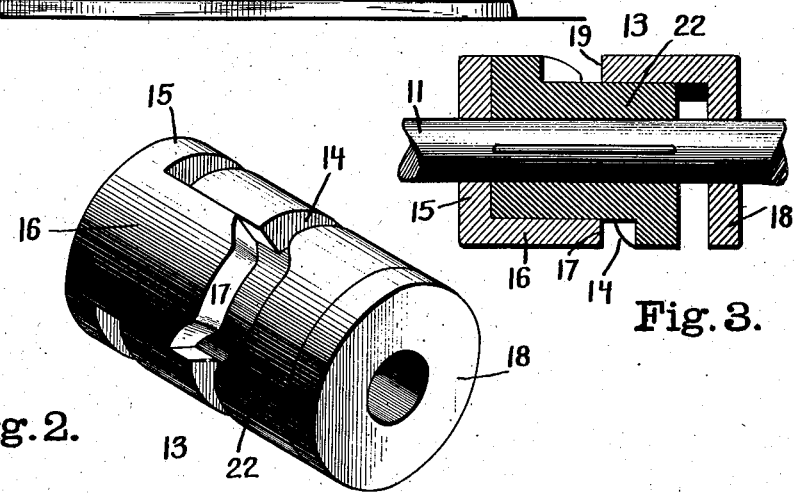
Fig. 2.
Fig. 3.
Witnesses:
Elmer R. Shipley.
M. S. Belden.
Willard Thomas Sears.
Inventor
by James W. See
Attorney No. 815,642. PATENTED MAR. 20, 1906.
W. T. SEARS.
SPEED CHANGER.
APPLICATION FILED SEPT. 29, 1905.

2 SHEETS—SHEET 2.

Witnesses:
Elmer R. Shipley.
M. S. Belden.

Willard Thomas Sears,
Inventor
by James W. See
Attorney

UNITED STATES PATENT OFFICE.

WILLARD THOMAS SEARS, OF PHILADELPHIA, PENNSYLVANIA, ASSIGNOR TO NILES-BEMENT-POND COMPANY, OF JERSEY CITY, NEW JERSEY.

SPEED-CHANGER.

No. 815,642.　　　　Specification of Letters Patent.　　Patented March 20, 1906.

Application filed September 29, 1905. Serial No. 280,587.

*To all whom it may concern:*

Be it known that I, WILLARD THOMAS SEARS, a citizen of the United States, residing in Philadelphia, Philadelphia county, Pennsylvania, (post-office address, Twenty-first and Callowhill streets, Philadelphia, Pennsylvania,) have invented certain new and useful Improvements in Speed - Changers, of which the following is a specification.

This invention, pertaining to speed-changers, will be readily understood from the following description, taken in connection with the accompanying drawings, in which—

Figure 4:
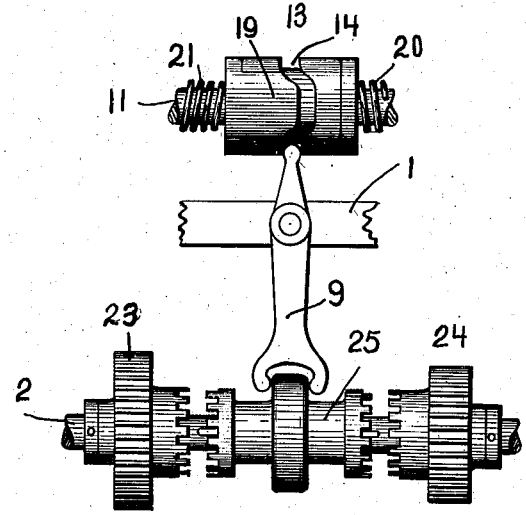

Figure 1 is a front elevation of a speed-changing mechanism exemplifying my invention; Fig. 2, a perspective view of the gear-throwing cam with its lobe 17 in retreated position; Fig. 3, a diametrical section of the same cam with its lobe 19 in retreated position; Fig. 4, a front elevation of parts generally similar to those illustrated in the preceding figures, but illustrating the employment of toothed clutches instead of sliding gears; and Fig. 5, a similar view of parts, illustrating a modification in which the elastic element of the system is disposed in the lever mechanism operated by the cam.

In the drawings, 1 indicates framework, merely typical in form; 2, the driving-shaft; 3, the driven shaft; 4, a friction-clutch upon the driving-shaft and serving as means by which rotation may be imparted to the driving-shaft; 5, a gear fast on the driven shaft; 6, another but larger gear fast on the driven shaft; 7, a gear splined on the driving-shaft and adapted to engage gear 5; 8, a gear splined on the driving-shaft and adapted to engage gear 6, the two gears 7 and 8 being unified so as to slide together and their combined thickness being less than the distance between the gears 5 and 6; 9, a lever-shifter for sliding the gears 7 and 8; 10, a lever-shifter for throwing the friction-clutch into and out of action; 11, an adjusting-shaft; 12, a cam fast on the adjusting-shaft and adapted by the turning of that shaft to actuate the lever 10 to engage or disengage the friction-clutch; 13, a gear-throwing cam, considered as a whole, mounted on the adjusting-shaft so as to be rotated by it; 14, a circumferential groove in cam 13, this groove engaging the lever 9 and being of such form that the turning of the adjusting-shaft may bring about the shifting of gears 7 and 8; 15, a flange at one end of cam 13, capable of sliding away from the end of the cam; 16, a tongue projecting inwardly from this flange and forming a portion of cam 13 and turning with it; 17, the inner extremity of this tongue, forming one of the lobes of cam 13; 18, a flange at the opposite end of cam 13; 19, the inner extremity of a tongue projecting inwardly from flange 18 and forming a second lobe in the groove of cam 13; 20, a spring urging flange 18 toward the gear-throwing cam; 21, a spring urging flange 15 toward the cam, and 22 the general body of cam 13.

Assume cam 13 to be a solid cam—that is to say, a cam whose groove has separable walls—and assume the parts to be in the position indicated in Fig. 1, with all parts at rest. It will be observed that gears 7 and 8 are in neutral position, so that if driving-shaft 2 be rotated no motion will be imparted to the driven shaft. If now adjusting-shaft 11 be appropriately turned, lobe 17 will cause lever 9 to shift gears 7 and 8 till gear 7 engages gear 5, cam 12 then throwing the friction-clutch into action, whereupon the driving-shaft will rotate and transmit motion to the driven shaft at relative rate due to the proportioning of gears 7 and 5. If the adjusting-shaft be turned somewhat farther, it will manifestly bring about the release of the friction-clutch and the subsequent restoration of the driving-gears to the neutral position, and if the adjusting-shaft be turned still farther lobe 19 will come into action and cause the transmission to take effect while gears 8 and 6 are engaged. Let it be assumed that when the attempt is made to slide gear 7 into engagement with gear 5 the teeth and spaces are not opposite, the result being that the ends of the teeth of one gear strike the ends of the teeth of the other gear. If cam 13 has its groove provided with stable walls, then this clashing of the gear-teeth would obviously prevent the further turning of the cam; but in the present case when the clash occurs lobe 17 yields outwardly against the resistance of spring 21, and when the friction-clutch is thrown into engagement and the driving-shaft starts into motion the clashing gear-teeth will quickly reach permissive position, whereupon the reaction of spring 21 will restore lobe 17 to its normal position in the cam and complete the engagement of the gears. Similarly when the adjusting-shaft is turned to bring lobe 19 into action.

Cam 13, considered as a whole, has a normal longitudinal position, and the purpose of the springs is to virtually permit the cam to yield longitudinally when the clashing of gear-teeth calls for such yielding, and to restore the cam to normal position when the teeth properly engage. Instead of permitting the cam as a whole to yield in case the gear-teeth clash it is manifestly sufficient that the active lobes of the cam be arranged to yield when necessary.

Figure 5:
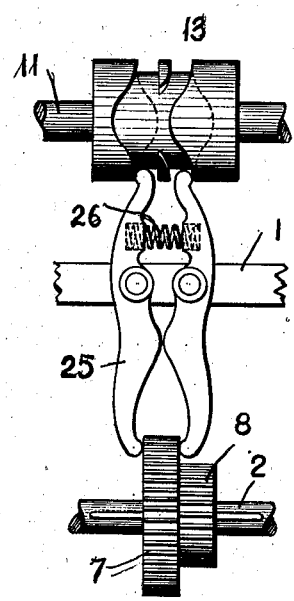

It will be manifest that the system is applicable to toothed clutches as well as to sliding gears. A modification, illustration, and arrangement employing toothed clutches is illustrated in Fig. 4, in which gears 23 and 24, each provided with toothed clutch-faces, are loose on shaft 2, these gears being alternatively locked to the shaft by means of toothed clutch 25, splined to the shaft and shifted from the neutral to either active position by the action of the cam in the same manner as has been described in connection with the sliding gears. If in sliding the clutch the ends of the tooth make clashing contact, the active cam-lobe will yield against the resistance of its spring, and the proper engagement of the clutches will occur when the conditions are favorable. Again, the yielding of the shifting mechanism in case of unfavorable conditions presenting themselves may be arranged to occur not at the lobe of the cam, but at a point in the shifting mechanism beyond the lobe. Fig. 5 illustrates such a modification, in which the cam 13 instead of having yielding lobes is a rigidly-formed structure, and the yielding element is found in the spring 26 between the shifting-levers 25. The action will be obvious. In any event whether the shifted member be a toothed clutch or a sliding gear and whether the yielding device be embodied in the cam or elsewhere it is often highly desirable that notwithstanding the action may be elastic or yielding when throwing the device into action a positive throw-out be present. For instance, assume that the gearing (illustrated in Fig. 1) providing for two changes of speed, be employed in conjunction with a second similar arrangement providing for two more changes of speed. If one pair of gears be thrown into action by means of an elastic shifting device and a previously-used pair of gears be thrown out of action by means of an elastic shifting device, it might happen that the last-mentioned device would not perform promptly, in which event gears corresponding with two different speeds might be in engagement at once, the result of which contingency would be a deadlock and probably a breakage. While the positive throw-out might not be essential in all cases, it is to be observed that in all of the constructions I have illustrated the throw-out motion of the shifter is positive notwithstanding the shifter acts elastically in its engagement-producing direction.

I claim as my invention—

1. In a speed-changer, the combination, substantially as set forth, of a first toothed member, a shaft, a sliding toothed member mounted on the shaft and adapted to move to and from engagement with the first toothed member, a cam, means for turning the cam, a lever connecting the cam and sliding member whereby the turning of the cam shifts the sliding member, and a spring coacting with the cam and lever to permit the sliding member to rest while the cam is turning and tending to move the sliding member to position of engagement with the first toothed member.

2. In a speed-changer, the combination, substantially as set forth, of a first toothed member, a shaft, a sliding toothed member mounted on the shaft and adapted to move to and from engagement with the first toothed member, a cam, means for turning the cam, a lever connecting the cam and sliding member whereby the turning of the cam shifts the sliding member, a spring coacting with the cam and lever to permit the sliding member to rest while the cam is turning and tending to move the sliding member to active position, and a cam member upon said cam arranged to operate upon said lever independent of the action of the spring, whereby the turning of the cam results in the positive throwing of the sliding member out of engagement with the first toothed member.

3. In a speed-changer, the combination, substantially as set forth, of a shaft, a sliding toothed member, a shifter for moving the sliding toothed member, a lobed cam for operating the shifter, means for moving the cam, and springs engaging the cam and holding its lobes in normal position and adapted to yield and permit the retreat of the lobes.

4. In a speed-changer, the combination, substantially as set forth, of a shaft, a sliding toothed member, a shifter for moving the sliding toothed member, a lobed cam for operating the shifter, means for moving the cam, springs engaging the cam and holding its lobes in normal position and adapted to yield and permit the retreat of the lobes, a friction-clutch upon the shaft, a shifter for actuating the clutch, a cam for operating the shifter of the clutch, and means connecting said two cams to cause them to move in unison.

5. In a speed-changer, the combination, substantially as set forth, of a shaft, a sliding toothed member, a shifter for moving the sliding toothed member, a lobed cam for operating the shifter, means for moving the cam, and springs holding the cam-lobes yieldingly to normal position.

6. In a speed-changer, the combination, substantially as set forth, of a shaft, a sliding toothed member, a shifter for moving the sliding toothed member, a lobed cam for operating the shifter, a rotary adjusting-shaft carrying said cam, and springs engaging said cam and serving to yieldingly hold its lobes to normal position.

7. In a speed-changer, the combination, substantially as set forth, of a driving-shaft, a sliding toothed member, a shifter for moving the sliding toothed member, a lobed cam for operating the shifter, a rotary adjusting-shaft carrying said cam, springs engaging said cam and serving to yieldingly hold its lobes to normal position, a friction-clutch on the driving-shaft, a shifter for the clutch, and a cam on said adjusting-shaft for operating said clutch-shifter.

8. In a speed-changer, the combination, substantially as set forth, of a shaft, a toothed sliding member, a shifter for moving the sliding toothed member, an adjusting-shaft, a circumferentially-grooved cam-body on said shaft, tongues sliding in said cam-body and carrying lobes forming portions of the walls of said groove, and springs holding said tongues yieldingly to normal position.

9. In a speed-changer, the combination, substantially as set forth, of a driving-shaft, a sliding toothed member, a shifter for moving the sliding toothed member, an adjusting-shaft, a circumferentially-grooved cam-body on said adjusting-shaft, tongues sliding in said cam-body and carrying lobes forming portions of the walls of said groove, springs holding said tongues yieldingly to normal position, a friction-clutch on the driving-shaft, a shifter for the clutch, and a cam on said adjusting-shaft for operating the clutch-shifter.

10. In a speed-changer, the combination, substantially as set forth, of a sliding toothed member, a shifting device for shifting said member positively in one direction, and a spring in the shifting device for elastically shifting said member in the opposite direction.

WILLARD THOMAS SEARS.

Witnesses:
E. H. WRAY,
ARCHIBALD M. O'BRIEN.